United States Patent
Chung et al.

(10) Patent No.: US 7,663,832 B2
(45) Date of Patent: Feb. 16, 2010

(54) METHOD OF COMPENSATING FOR TRACK ZERO POSITION IN REFERENCE SERVO TRACK COPYING SYSTEM AND DISC DRIVE USING THE SAME

(75) Inventors: Da-woon Chung, Suwon-si (KR); Jun Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 787 days.

(21) Appl. No.: 11/287,406

(22) Filed: Nov. 28, 2005

(65) Prior Publication Data

US 2006/0114597 A1 Jun. 1, 2006

(30) Foreign Application Priority Data

Nov. 30, 2004 (KR) .................. 10-2004-0099054

(51) Int. Cl.
*G11B 21/02* (2006.01)
(52) U.S. Cl. .................. 360/75; 360/77.02; 360/77.04; 360/77.06; 360/78.04; 360/53
(58) Field of Classification Search .................. 360/75, 360/76, 77.01, 77.02, 77.04, 77.06, 15, 48, 360/53, 78.04
See application file for complete search history.

(56) References Cited

U.S. PATENT DOCUMENTS

| | | | | | |
|---|---|---|---|---|---|
| 4,471,396 | A | * | 9/1984 | Iftikar et al. ............. | 360/265.1 |
| 4,876,618 | A | * | 10/1989 | Ide et al. .................. | 360/78.13 |
| 4,935,835 | A | * | 6/1990 | Godwin et al. ............. | 360/135 |
| 5,559,648 | A | * | 9/1996 | Hunter et al. .............. | 360/75 |
| 5,719,719 | A | * | 2/1998 | Tsuyoshi et al. ............ | 360/66 |
| 5,940,242 | A | * | 8/1999 | Lee ......................... | 360/78.08 |
| 5,999,375 | A | * | 12/1999 | Forbord et al. ............ | 360/265.1 |
| 6,049,440 | A | * | 4/2000 | Shu ......................... | 360/77.04 |
| 6,091,559 | A | * | 7/2000 | Emo et al. .................. | 360/48 |
| 6,493,173 | B1 | * | 12/2002 | Kim et al. ................. | 360/77.04 |
| 6,496,322 | B1 | * | 12/2002 | Hasegawa et al. .......... | 360/77.08 |
| 6,603,627 | B1 | * | 8/2003 | Chainer et al. ............. | 360/75 |
| 6,614,614 | B1 | * | 9/2003 | Murayama et al. ......... | 360/77.02 |
| 6,704,156 | B1 | * | 3/2004 | Baker et al. ............... | 360/75 |
| 6,819,519 | B2 | * | 11/2004 | Takaishi et al. ........... | 360/77.02 |

(Continued)

FOREIGN PATENT DOCUMENTS

KR 1992-20409 11/1992

(Continued)

*Primary Examiner*—Dismery E Mercedes
(74) *Attorney, Agent, or Firm*—Staas & Halsey LLP (57) ABSTRACT

A method and apparatus for exactly compensating for a track zero position when copying a reference servo pattern in a disc drive adopting a reference servo track copying method. The method of compensating for a track zero position in a reference servo track copy system for copying a reference servo pattern in a head disc assembly into which a reference disc, on which the reference servo pattern is recorded, produced offline and at least one blank disc are assembled, includes: searching for a collision position of an actuator arm against a stopper for limiting the displacement of the actuator arm on the reference servo pattern; calculating an optimal track zero position based on the searched collision position; and copying the reference servo pattern on all disc surfaces from the calculated optimal track zero position.

20 Claims, 6 Drawing Sheets

U.S. PATENT DOCUMENTS

| | | | |
|---|---|---|---|
| 7,027,252 B2 * | 4/2006 | Cosci et al. | 360/75 |
| 7,265,933 B1 * | 9/2007 | Phan et al. | 360/77.04 |
| 7,277,250 B2 * | 10/2007 | Park et al. | 360/75 |
| 7,301,720 B2 * | 11/2007 | Lee | 360/75 |
| 7,333,281 B2 * | 2/2008 | Park et al. | 360/53 |
| 7,397,623 B2 * | 7/2008 | Khor et al. | 360/75 |
| 7,463,445 B2 * | 12/2008 | Lee | 360/78.14 |
| 2002/0135927 A1 * | 9/2002 | Yatsu | 360/75 |
| 2003/0081341 A1 * | 5/2003 | Wilson | 360/69 |
| 2004/0228025 A1 * | 11/2004 | Ono et al. | 360/75 |
| 2005/0041321 A1 * | 2/2005 | Settje et al. | 360/77.02 |
| 2005/0280916 A1 * | 12/2005 | Calfee et al. | 360/75 |

FOREIGN PATENT DOCUMENTS

| | | |
|---|---|---|
| KR | 100242290 | 11/1999 |
| KR | 2003-39298 | 5/2003 |

* cited by examiner

METHOD OF COMPENSATING FOR TRACK ZERO POSITION IN REFERENCE SERVO TRACK COPYING SYSTEM AND DISC DRIVE USING THE SAME

CROSS-REFERENCE TO RELATED APPLICATIONS

This application claims the benefit of Korean Patent Application No. 10-2004-0099054, filed on Nov. 30, 2004, in the Korean Intellectual Property Office, the disclosure of which is incorporated herein in its entirety by reference.

BACKGROUND OF THE INVENTION

1. Field of the Invention

The present invention relates to a servo information recording method and apparatus for a disc drive, and more particularly, to a method and apparatus for exactly compensating for a track zero position when copying a reference servo pattern in a disc drive adopting a reference servo track copying method.

2. Description of the Related Art

Commonly, hard disc drives (HDDs), a kind of data storage device, reproduce data recorded on a disc or write data on a disc using a magnetic head. According to the trend for high capacity, high density, and compactness of the HDDs, the number of bits per inch (BPI), which denotes the recording density in a disc rotating direction, and the number of tracks per inch (TPI), which denotes the recording density in a disc diameter direction, has been increased. Accordingly, a more elaborate operation mechanism is required for the HDDs.

Figure 1:
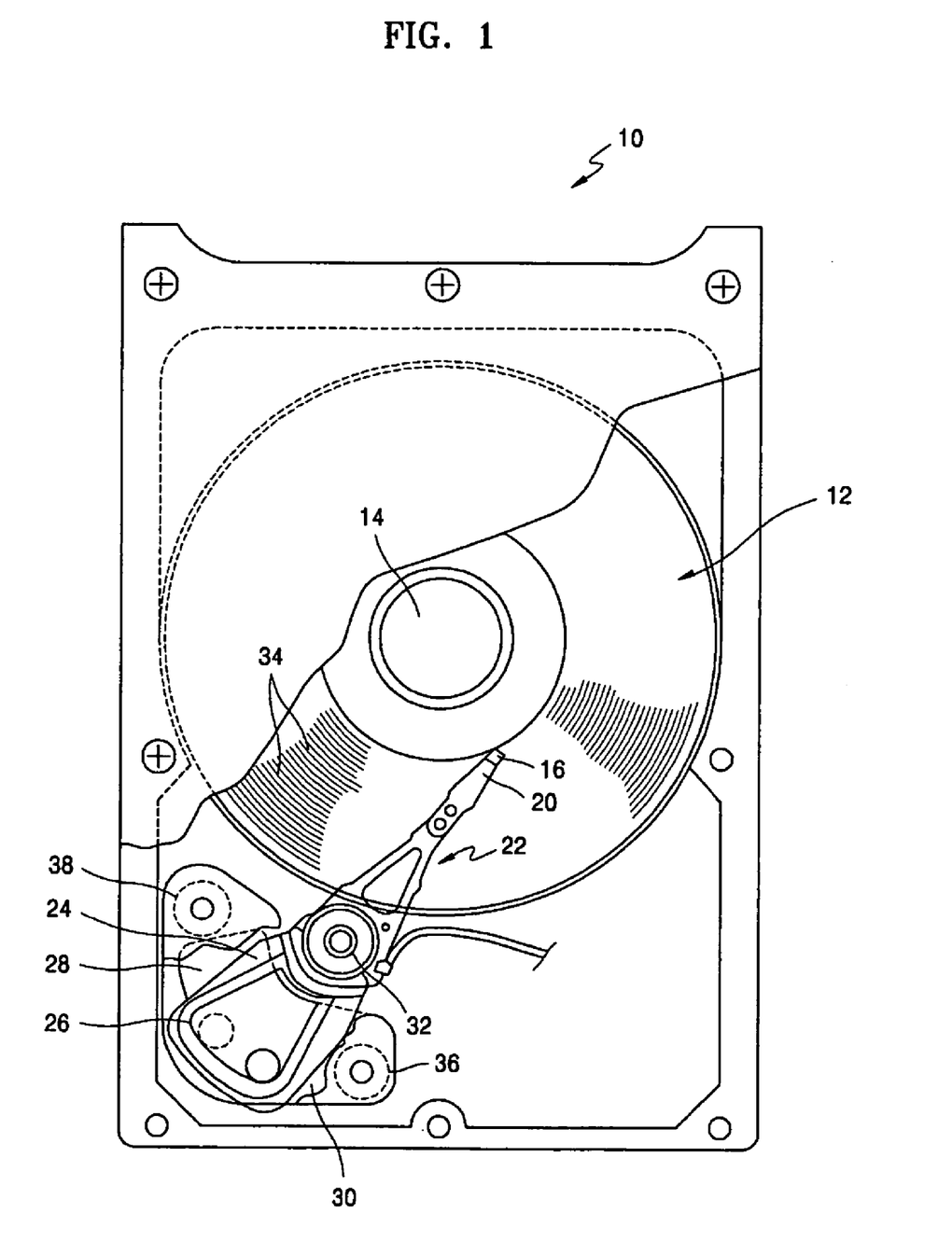
FIG. 1 is a schematic top view of an HDA of an HDD to which an embodiment of the present invention is applied.

An HDD includes a head disk assembly (HDA) and a printed circuit board (PCB) assembly, which is involved in writing and reading of information by electrically controlling the HDA. As shown in FIG. 1, the HDA includes a head 16 for writing or reading information, a disc 12 having recorded thereon information from the head 16, a spindle motor (not shown) for rotating the disc 12, an actuator arm 24 for moving the head 16, a voice coil motor (VCM) 30, and an inner crash stop (ICS) 36 and an outer crash stop (OCS) 38 for limiting the displacement of the actuator arm 24. Here, the ICS 36 and the OCS 38 are bumpers for preventing the head 16 from moving to locations at which servo information of the disc 12 is not recorded.

The servo information is necessary to perform position control of the head 16 on the disc 12 so that data can be read/written from/on a desired position of the disc 12. Writing the servo information on the disc 12 is called a servo track write (STW) operation.

An increase of recording density of HDDs results in an increase of the number of tracks, and a ratio of the time for the STW operation to the time for the entire operation is gradually higher.

To improve this problem, a method of not writing servo information of discs after the discs are assembled with HDDs but directly assembling discs on which servo information is recorded with HDDs is developed, and this STW method is called an offline STW method.

However, in the offline STW method, since a rotational axis of a disc is not equal to the center of servo tracks, since a track center of a disc is not equal to a track center of another disc, or since centers of tracks on a disc surface are not the same, the servo control performance is decreased.

Figure 2:
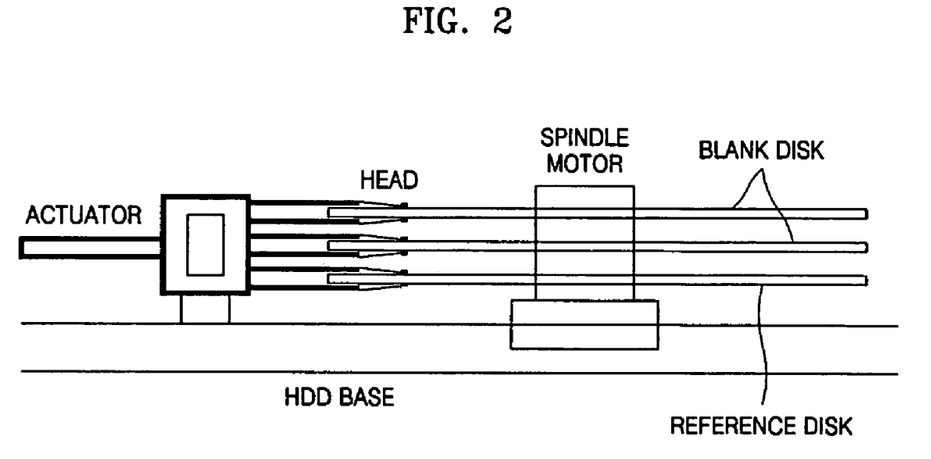
FIG. 2 illustrates a state in which a reference disc and blank discs are assembled in an HDA of a reference servo track copy system according to an embodiment of the present invention.

An STW technology developed to solve this problem is called a reference servo track copying method. As shown in FIG. 2, in this method, after one reference disc on which servo information is recorded and blank discs on which the servo information is not recorded are assembled with an HDD, an offline servo track writer writes the same reference servo pattern on all disc surfaces operated at the same time along with tracing servo tracks written on the reference disc.

Figure 5A:
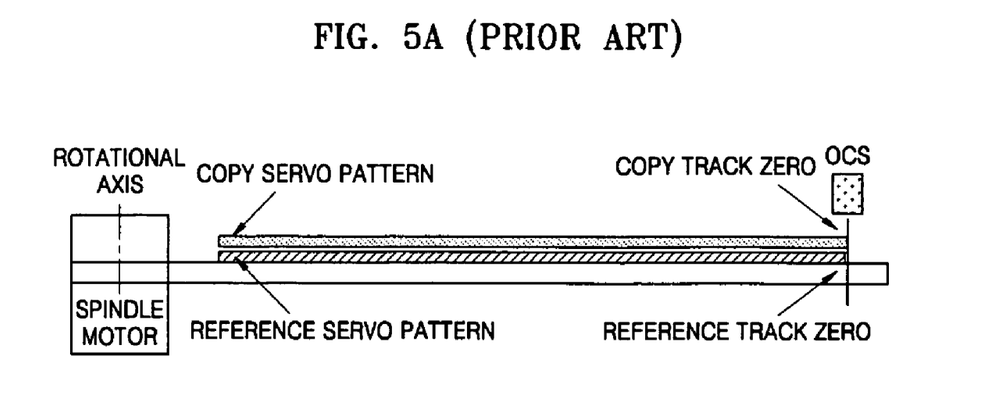
FIG. 5A illustrates a reference servo pattern and a copy servo pattern in a servo copy method according to the prior art.

Accordingly, in a reference servo track copying method according to the conventional technology, a reference servo pattern is copied by harmonizing a reference track zero position with a copy track zero position as shown in FIG. 5A.

As one of problems generated due to the reference servo track copying method, beginning positions of reference servo tracks are irregular due to disarrangement of heads of the offline servo track writer or occurrence of concentricity, and thus the head 16 may collide against the ICS 36 or the OCS 38 after assembly.

According to the conventional technology, after track zero compensation information is sought in a separate operation after servo pattern writing and is stored in a specific position on a memory or a disc, the track zero compensation information is read and loaded in random access memory (RAM) when an HDD is initialized, and thus an actual track zero position should be adjusted in every track seek procedure using the track zero compensation information. Accordingly, an access time is longer.

In addition, in a case where the track zero compensation information is stored in flash memory, if a PCB assembly is replaced, the track zero compensation information cannot be recognized. Also, in a case where the track zero compensation information is stored at a specific position of a disc, if a reading characteristic is unstable when an HDD is initialized, the track zero compensation information cannot be read, or a drive warming-up time is longer.

SUMMARY OF THE INVENTION

Additional aspects and/or advantages of the invention will be set forth in part in the description which follows and, in part, will be apparent from the description, or may be learned by practice of the invention.

The present invention provides a reference servo track copying method of compensating for a track zero position in a reference servo track copy system for seeking the track zero position at which an actuator arm does not collide against an inner crash stop (ICS) and an outer crash stop (OCS) and for writing a reference servo track based on the track zero position, and a disc drive using the same.

According to an aspect of the present invention, there is provided a method of compensating for a track zero position in a reference servo track copy system for copying a reference servo pattern in a head disc assembly into which a reference disc, on which the reference servo pattern is recorded, produced in offline and at least one blank disc are assembled, the method including: searching for a collision position of an actuator arm against a stopper for limiting the displacement of the actuator arm on the reference servo pattern; calculating an optimal track zero position based on the searched collision position; and copying the reference servo pattern on all disc surfaces from the calculated optimal track zero position.

According to another aspect of the present invention, there is provided a disc drive for a data storage system, the disc drive including: a head disc assembly into which a reference disc, on which a reference servo pattern is recorded, produced in offline and at least one blank disc are assembled; a host interface for performing a data transmission/reception process with a host device; a buffer for sequentially storing data transmitted from the host device or data read from the discs; a controller controlling the disc drive to search for a collision position of an actuator arm against a stopper for limiting the displacement of the actuator arm on the reference servo pattern in response to a command input from the host device, calculate an optimal track zero position based on the searched collision position, read reference servo pattern information recorded on the reference disc from the calculated optimal track zero position, sequentially store the read reference servo pattern information in the buffer, and simultaneously copy the reference servo pattern sequentially output from the buffer on the surfaces of all discs assembled into the head disc assembly; and a write/read circuit performing data processing for reading the reference servo pattern information from the reference disc and storing the reference servo pattern information in the buffer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

A hard disc drive (HDD) is constituted of a head disc assembly (HDA), which includes various mechanical components, and an electrical circuit.

FIG. 1 is a schematic top view of an HDA 10 of an HDD to which an embodiment of the present invention is applied. Referring to FIG. 1, the HDA 10 includes at least one magnetic disc 12 rotated by a spindle motor 14. The HDA 10 also includes a head 16 adjacently located on a disc surface.

The head 16 can read or write information from or on the rotating disc 12 by sensing a magnetic field formed on the disc 12 or magnetizing the disc 12. Typically, the head 16 is associated with each disc surface. Though a single head 16 is shown in FIG. 1, the head 16 includes a write head (not shown) that magnetizes the disc 12 and a read head (not shown) that senses a magnetic field of the disc 12. The read head is composed of a magneto-resistive (MR) component.

The head 16 can be incorporated into a slider 20. The slider 20 generates an air bearing between the head 16 and the disc surface. The slider 20 is incorporated into a head stack assembly (HSA) 22. The HSA 22 is attached to an actuator arm 24 having a voice coil 26. The voice coil 26 is located adjacent to a magnetic assembly 28 to define a voice coil motor (VCM) 30. A current supplied to the voice coil 26 generates a torque that rotates the actuator arm 24 around a bearing assembly 32. The rotation of the actuator arm 24 moves the head 16 across the disc surface.

Information is stored in annular tracks of the disc 12. In general, each track 34 includes a plurality of sectors. Each sector includes a data field and an identification field. The identification field includes a Gray code for identifying a sector and a track (cylinder). The head 16 moves across the disc surface in order to read or write information from or on another track.

In a reference servo track copy system according to an embodiment of the present invention, a reference disc and at least one blank disc are assembled with the HDA 10, is shown in FIG. 2. For convenience of description, the number of blank discs is 2 in FIG. 2.

Figure 7:
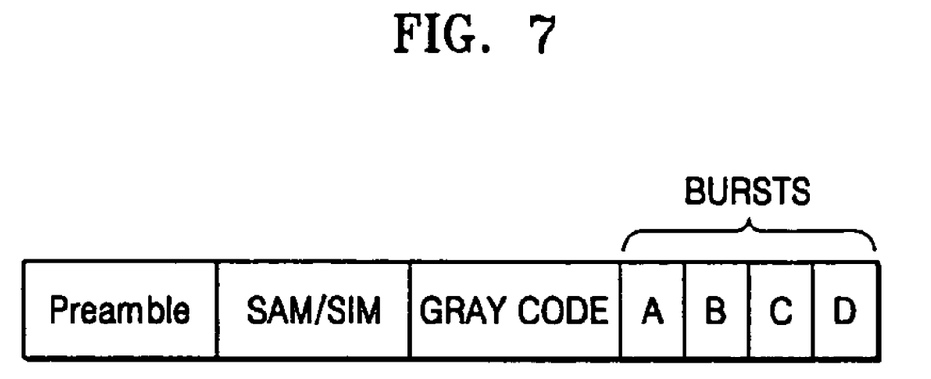
FIG. 7 illustrates a typical servo pattern.

A servo pattern recorded on a disc of the HDD includes a preamble, a servo address/index mark (SAM/SIM), Gray code, and bursts A, B, C, and D shown in FIG. 7.

The preamble provides a constant timing margin by having a gap before a servo sector. The SAM indicates the beginning of the servo sector, and the SIM provides one rotation information of the disc. The Gray code provides track and sector information, and the burst signals are used to control a head position.

Figure 3:
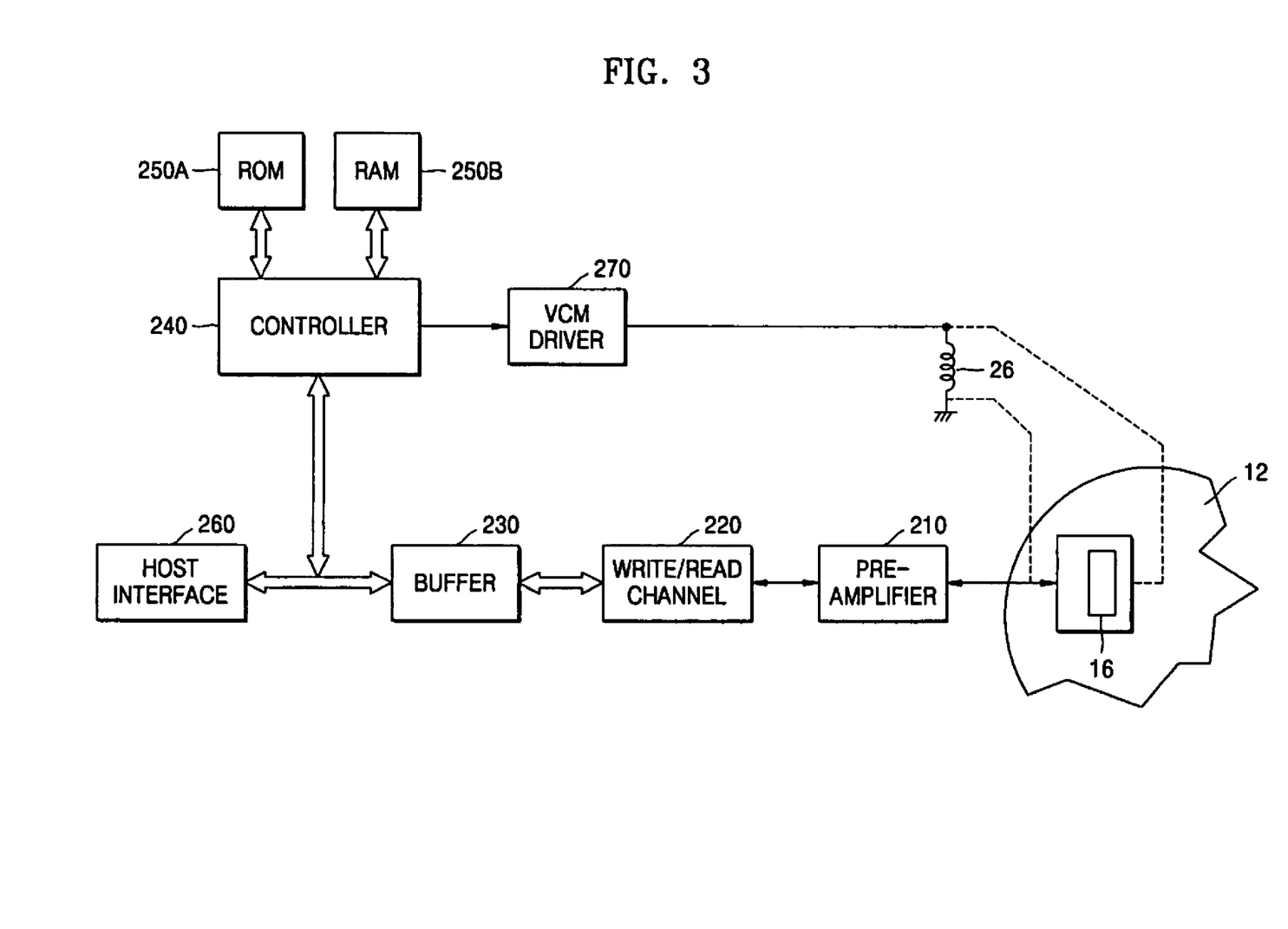
FIG. 3 is an electrical circuit configuration of the disc drive to which a reference servo track copying method according to an embodiment of the present invention is applied.

FIG. 3 is an electrical circuit configuration of the disc drive to which a reference servo track copying method according to an embodiment of the present invention is applied.

Referring to FIG. 3, the disc drive includes the disc 12, the head 16, a pre-amplifier 210, a write/read channel 220, a buffer 230, a controller 240, a ROM 250A, a RAM 250B, a host interface 260, and a VCM driver 270.

A circuit including the pre-amplifier 210 and the write/read channel 220 is called a write/read circuit.

In the ROM 250A, firmware and control information for controlling the disc drive are stored, and in the RAM 250B, information required for driving the disc drive, which is read from the ROM 250A or the disc 12 when the disc drive is initialized, is stored.

The operation of the disc drive will now be described.

In a data read mode, the disc drive amplifies an electrical signal sensed by the head 16 using the pre-amplifier 210. The disc drive encodes the amplified analog signal into a digital signal that can be read by a host device (not shown) using the write/read channel 220, converts the digital signal to stream data, temporarily stores the stream data in the buffer 230, and transmits the stream data to the host device via the host interface 260. In a reference servo track copy mode according to the present embodiment, reference servo information read from the reference disc is sequentially stored in the buffer 230.

In a data write mode, the disc drive receives data from the host device via the host interface 260, temporarily stores the received data in the buffer 230, sequentially outputs the data stored in the buffer 230, converts the sequentially output data to a binary data stream suitable for a write channel using the write/read channel 220, and writes the data using a write current amplified by the pre-amplifier 210 on the disc 12 through the head 16.

The controller 240 analyzes a command received from the host device through the host interface 260 and performs a control corresponding to the analyzed results, and if a series of commands to perform a reference servo track copy operation are received from the host device, the controller 240 controls the disc drive to search for a collision position of an actuator arm 24 against a stopper for limiting the displacement of the actuator arm 24 on the reference servo pattern of the reference disc, calculate an optimal track zero position based on the searched collision position, read reference servo pattern information recorded on the reference disc from the calculated optimal track zero position, sequentially store the read reference servo pattern information in the buffer 230, and simultaneously copy the reference servo pattern sequentially output from the buffer 230 in a first-in-first-out (FIFO) method on the surfaces of all discs assembled into the HDA 10.

The stopper includes an outer crash stop (OCS) 38 for preventing the actuator arm 24 from moving outside the utmost outer circumference of the disc 12 and an inner crash stop (ICS) 36 for preventing the actuator arm 24 from moving inside the utmost inner circumference of the disc 12. Here, the ICS 36 can be omitted according to the design specification.

In order to search for the position at which the actuator arm 24 collides against the OCS 38, the controller 240 monitors a position error signal or a repeatable run-out compensation signal along with performing a track seek in predetermined track units in a direction from a position, which is located sufficiently apart from the OCS 38 in the inner circumference direction, to the outer circumference. If the actuator arm 24 collides against the OCS 38, the magnitude of the position error signal is greater than a predetermined level, and the repeatable run-out compensation signal is changed to a sine curve, which is more asymmetrical than a predetermined ratio. Accordingly, the controller 240 determines the track position at which the magnitude of the position error signal is greater than the predetermined level or the track position at which the repeatable run-out compensation signal is changed to a sine curve, which is more asymmetrical than the predetermined ratio, as the position at which the actuator arm 24 collides against the OCS 38 as the monitoring results.

The controller 240 can search for a position at which the actuator arm 24 collides against the ICS 36 in the same way. In a process for searching for the position at which the actuator arm 24 collides against the ICS 36, the controller 240 monitors the position error signal or the repeatable run-out compensation signal along with performing a track seek in predetermined track units in a direction from a position, which is located sufficiently apart from the ICS 36 in the outer circumference direction, to the inner circumference.

The controller 240 determines an optimal track zero position with a value on which the number of anti-collision offset tracks corresponding to a predetermined distance from the position at which the actuator arm 24 collides against the OCS 38 is reflected. Also, the controller 240 calculates the number of available tracks in which the track seek is possible without colliding against the ICS 36 based on the optimal track zero position, and if the calculated number of available tracks is less than the number of tracks corresponding to recording capacity guaranteed by the disc drive, the disc drive is processed as inferior goods.

Figure 6:
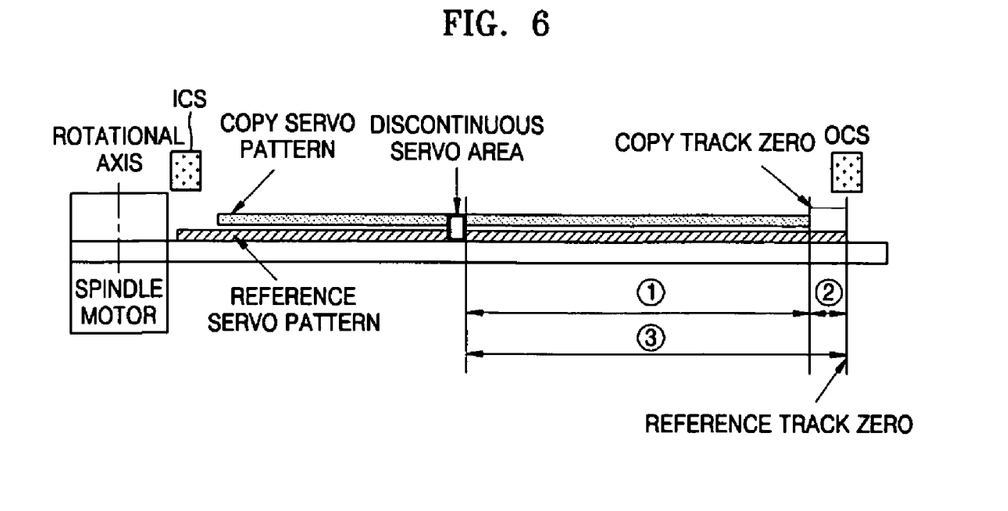
FIG. 6 illustrates a method of converting a discontinuous servo track position in the track zero position compensating method according to an embodiment of the present invention.

The controller 240 controls the disc drive to copy the reference servo pattern on the surfaces of all discs by converting a position of a discontinuous servo area of the reference servo pattern based on the optimal track zero (copy track zero) position as shown in FIG. 6 in a process for copying the reference servo pattern. A track conversion position (1) of the position of the discontinuous servo area in a copied disc is determined by a value obtained by subtracting a difference (2) between the reference track zero position and the optimal track zero position from a discontinuous servo track position (3) of the reference disc.

Figure 4:
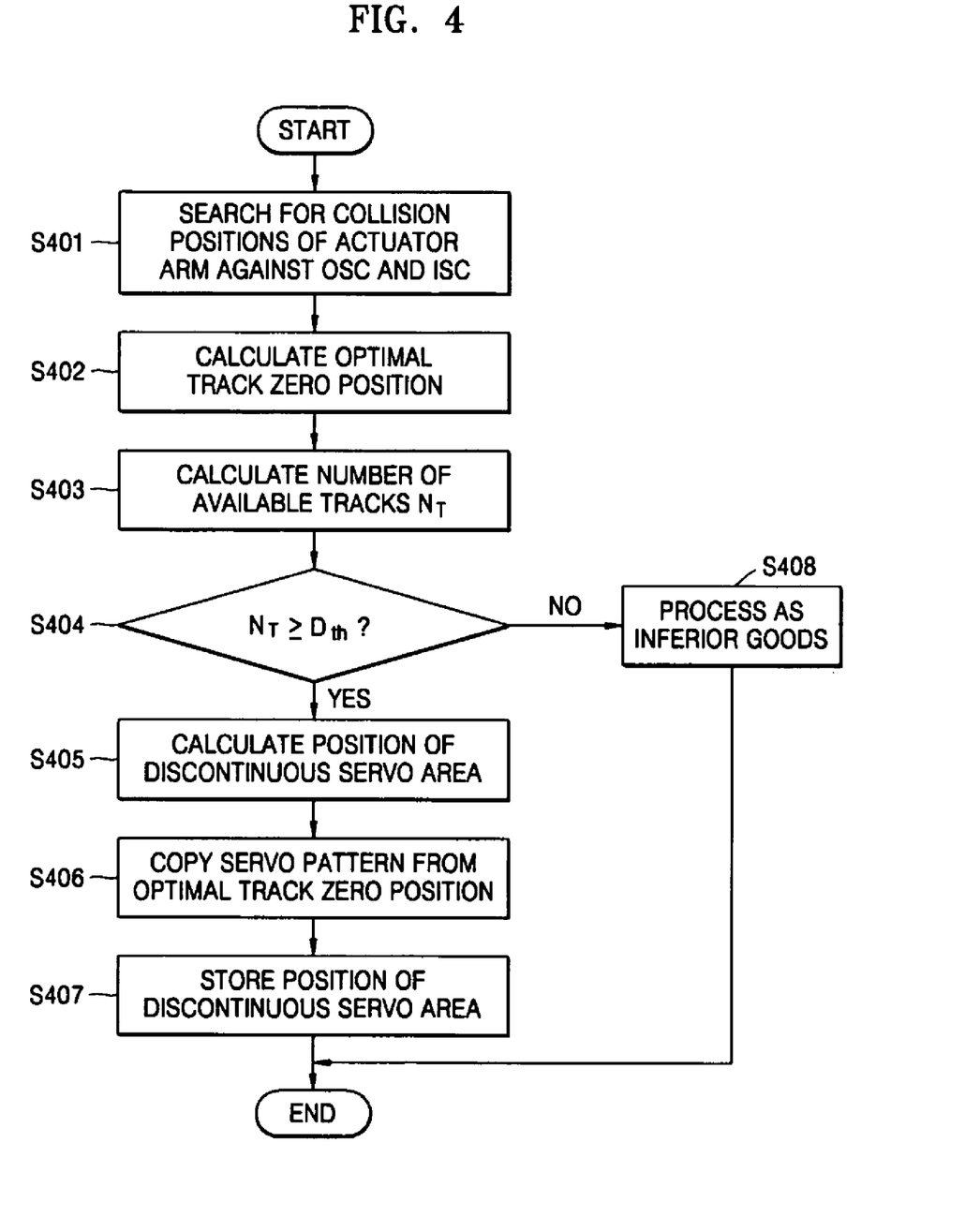
FIG. 4 is a flowchart illustrating a method of compensating for a track zero position in the reference servo track copy system according to an embodiment of the present invention.

A method of compensating for a track zero position in the reference servo track copy system according to an embodiment of the present invention will now be described with reference to FIG. 4.

A reference disc is produced offline and assembled into an HDA with blank discs together as shown in FIG. 2. When the reference disc is produced, the number of tracks of a reference servo pattern is designed so as to be greater than the number of tracks of a final servo pattern to be actually used.

After the reference disc and at least one blank disc are assembled into the HDA, an optimal track zero position is sought by a process described below, and thus the reference servo pattern is copied on the surfaces of all discs assembled into the HDA.

A position at which the actuator arm 24 collides against the OCS 38 is sought from the reference disc in operation S401. Since the method of searching for positions at which the actuator arm 24 collides against the OCS 38 and the ICS 36 is described above in detail, it is omitted.

Figure 5B:
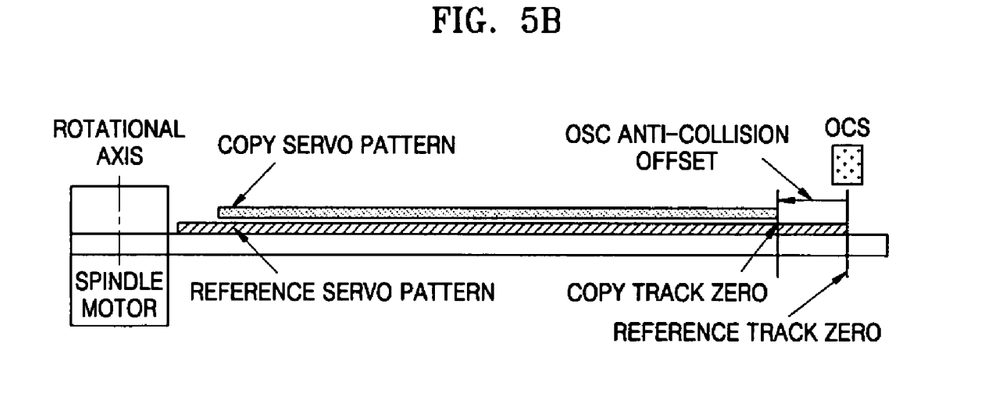
FIG. 5B illustrates a reference servo pattern and a copy servo pattern in the track zero position compensating method according to an embodiment of the present invention.

The optimal track zero position is calculated based on the position at which the actuator arm 24 collides against the OCS 38 in operation S402. That is, as shown in FIG. 5B, a position obtained by adding the predetermined number of offset tracks for anti-collision against the OCS 38 to the collision position against the OCS 38 is determined as the optimal track zero position (in other words, a copy track zero position).

The number of tracks $N_T$ that can be used without colliding against the OCS 38 is calculated based on the newly determined copy track zero position in operation S403. That is, the number of tracks existing between the newly determined copy track zero position and a position obtained by subtracting the predetermined number of offset tracks from the position at which the actuator arm 24 collides against the ICS 36 corresponds to the number of available tracks $N_T$.

The number of available tracks $N_T$ is compared with the threshold number of tracks $D_{th}$ to be copied corresponding to data storage capacity of a disc drive in operation S404.

If the number of available tracks $N_T$ is equal to or greater than the threshold number of tracks $D_{th}$ as the comparison result, calculation to convert a position of a discontinuous servo area of the reference servo pattern based on the optimal track zero (copy track zero) position as shown in FIG. 6 is performed in operation S405.

In operation S406, the reference servo pattern recorded on the reference disc is read from the optimal track zero (copy track zero) position to a position obtained by subtracting the predetermined number of offset tracks from the collision position against the ICS 36, and a process for copying the reference servo pattern on the surfaces of all discs assembled into the HDA including the reference disc.

In operation S407, conversion track position information of the position of the discontinuous servo area calculated in operation S405 is stored in the copy track zero position. The position information of the discontinuous servo area stored in the copy track zero position is used for servo control by reading when the disc drive is initialized.

If the number of available tracks $N_T$ is less than the threshold number of tracks $D_{th}$ as the comparison result of operation S404, the disc drive is processed as inferior goods since the number of available tracks $N_T$ does not reach data storage capacity guaranteed by the disc drive in operation S408.

As described above, according to embodiments of the present invention, by searching for a track zero position at which an actuator arm does not collide against an ICS or an OCS and controlling a disc drive to write a reference servo pattern based on the track zero position, an access time can be reduced since track zero compensation does not have to be reflected in every seek mode. Also, since a process for reading track zero compensation information does not have to be performed whenever the disc drive is initialized, an operational preparation time of the disc drive can be reduced.

The present invention can be realized as a method, an apparatus, and/or a system. When the present invention is realized as software, components of the present invention are embodied as code segments for executing required operations. A program or the code segments can be stored in a processor readable recording medium and transmitted as computer data signals combined with a carrier using a transmission medium or a communication network. The processor readable recording medium is any data storage device that can store or transmit data which can be thereafter read by a computer system. Examples of the processor readable recording medium include electronic circuits, semiconductor memory devices, read-only memory (ROM), flash memory, erasable ROM, floppy disks, optical discs, hard discs, optical fiber media, and RF networks. The computer data signals include any signal which can be propagated via transmission media such as electronic network channels, optical fibers, air, electronic fields, RF networks.

While this invention has been particularly shown and described with reference to embodiments thereof, it will be understood by those skilled in the art that various changes in form and details may be made therein without departing from the spirit and scope of the invention as defined by the appended claims. The above-described embodiments should be considered in a descriptive sense only and are not for purposes of limitation. Therefore, the scope of the invention is defined not by the detailed description of the invention but by the appended claims, and all differences within the scope will be construed as being included in the present invention.

What is claimed is:

1. A method of compensating for a track zero position in a reference servo track copy system for copying a reference servo pattern in a head disc assembly into which a reference disc, on which the reference servo pattern is recorded, produced offline and at least one blank disc are assembled, the method comprising:
    searching for a collision position of an actuator arm against a stopper for limiting the displacement of the actuator arm on the reference servo pattern;
    calculating an optimal track zero position based on the searched collision position;
    reading a reference servo pattern recorded on the reference disc from the calculated optimal track zero position; and
    copying the reference servo pattern on all disc surfaces from the calculated optimal track zero position.

2. The method of claim 1, wherein the stopper comprises an outer crash stop (OCS) for preventing the actuator arm from moving outside the utmost outer circumference.

3. The method of claim 1, wherein the stopper comprises an inner crash stop (ICS) for preventing the actuator arm from moving inside the utmost inner circumference.

4. The method of claim 1, further comprising:
    calculating the number of available tracks on a disc based on the optimal track zero position, and if the calculated number of available tracks is less than the predetermined threshold number of tracks to be copied, processing as inferior goods.

5. The method of claim 1, wherein the number of tracks of the reference servo pattern is designed so as to be greater than the number of tracks of a final servo pattern to be actually used.

6. The method of claim 1, wherein the searching for the collision position of the actuator arm against the stopper comprises:
    performing a track seek in predetermined track units in a direction from a predetermined position of the disc to the stopper using the actuator arm; and
    detecting a track position at which the magnitude of a position error signal exceeds a predetermined threshold when performing the track seek, and determining the detected track position as the collision position of the actuator arm against the stopper.

7. The method of claim 1, wherein the searching for the collision position of the actuator arm against the stopper comprises:
    performing a track seek in predetermined track units in a direction from a predetermined position of the disc to the stopper using the actuator arm; and
    detecting a track position at which a sine wave asymmetry ratio of a repeatable run-out compensation signal exceeds a predetermined ratio when performing the track seek, and determining the detected track position as the collision position of the actuator arm against the stopper.

8. The method of claim 1, wherein the optimal track zero position is determined as a value obtained by reflecting the predetermined number of anti-collision offset tracks on the position at which the actuator arm collides against the stopper for preventing the actuator arm from moving outside the utmost outer circumference.

9. The method of claim 1, wherein in the copying of the reference servo pattern, the reference servo pattern is copied by converting a position of a discontinuous servo area of the reference servo pattern based on the optimal track zero position.

10. The method of claim 9, wherein the position information of the discontinuous servo area converted based on the optimal track zero position is stored in the optimal track zero position, and when a disc drive is initialized next time, the position information of the discontinuous servo area is read from the optimal track zero position and applied to servo control.

11. A disc drive for a data storage system, the disc drive comprising:
    a head disc assembly into which a reference disc, on which a reference servo pattern is recorded, produced offline and at least one blank disc are assembled;
    a host interface for performing a data transmission/reception process with a host device;
    a buffer for sequentially storing data transmitted from the host device or data read from the discs;
    a controller controlling the disc drive to search for a collision position of an actuator arm against a stopper for limiting the displacement of the actuator arm on the reference servo pattern in response to a command input from the host device, calculate an optimal track zero position based on the searched collision position, read reference servo pattern information recorded on the reference disc from the calculated optimal track zero position, sequentially store the read reference servo pattern information in the buffer, and simultaneously copy the reference servo pattern sequentially output from the buffer on the surfaces of all discs assembled into the head disc assembly; and a write/read circuit performing data processing for reading the reference servo pattern information from the reference disc and storing the reference servo pattern information in the buffer.

12. The disc drive of claim 11, wherein the stopper includes an outer crash stop (OCS) for preventing the actuator arm from moving outside the utmost outer circumference.

13. The disc drive of claim 11, wherein the stopper includes an inner crash stop (ICS) for preventing the actuator arm from moving inside the utmost inner circumference.

14. The disc drive of claim 11, wherein the number of available tracks on a disc is calculated based on the optimal track zero position, and if the calculated number of available tracks is less than the predetermined threshold number of tracks to be copied, the disc drive is processed as inferior goods.

15. The disc drive of claim 11, wherein the collision position of the actuator arm against the stopper is determined as a track position at which the magnitude of a position error signal exceeds a predetermined threshold while performing a track seek in predetermined track units in a direction from a predetermined position of the disc to the stopper using the actuator arm.

16. The disc drive of claim 11, wherein the collision position of the actuator arm against the stopper is determined as a track position at which a sine wave asymmetry ratio of a repeatable run-out compensation signal exceeds a predetermined ratio while performing a track seek in predetermined track units in a direction from a predetermined position of the disc to the stopper using the actuator arm.

17. The disc drive of claim 11, wherein the optimal track zero position is determined as a value obtained by reflecting the predetermined number of anti-collision offset tracks on the position at which the actuator arm collides against the stopper for preventing the actuator arm from moving outside the utmost outer circumference.

18. The disc drive of claim 11, wherein in a process for copying of the reference servo pattern, the controller controls the disc drive to copy the reference servo pattern on the surfaces of all discs by converting a position of a discontinuous servo area of the reference servo pattern based on the optimal track zero position.

19. The disc drive of claim 11, further comprising a read only memory (ROM) storing firmware and control information for controlling the disc drive.

20. The disc drive of claim 19, further comprising a random access memory (RAM) storing information required for driving the disc drive which is read from the read only memory or the reference disc.

* * * * *